US012568463B2

(12) United States Patent
Taira

(10) Patent No.: US 12,568,463 B2
(45) Date of Patent: Mar. 3, 2026

(54) POSITIONING SYSTEM, POSITIONING NETWORK DEVICE, CONTROL CIRCUIT, STORAGE MEDIUM, AND POSITIONING METHOD

(71) Applicant: Mitsubishi Electric Corporation, Tokyo (JP)

(72) Inventor: Akinori Taira, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 356 days.

(21) Appl. No.: 18/206,696

(22) Filed: Jun. 7, 2023

(65) Prior Publication Data

US 2023/0319777 A1 Oct. 5, 2023

Related U.S. Application Data

(63) Continuation of application No. PCT/JP2021/005735, filed on Feb. 16, 2021.

(51) Int. Cl.
*H04W 64/00* (2009.01)
*H04L 5/00* (2006.01)

(52) U.S. Cl.
CPC ......... *H04W 64/006* (2013.01); *H04L 5/0051* (2013.01)

(58) Field of Classification Search
CPC .......................... H04W 64/006; H04L 5/0051

(Continued)

(56) References Cited

U.S. PATENT DOCUMENTS

| 7,072,673 B2 | 7/2006 | Tsunehara et al. |
| 9,253,596 B2 | 2/2016 | Sridhara et al. |

(Continued)

FOREIGN PATENT DOCUMENTS

| DE | 60 2004 004 701 T2 | 11/2007 |
| DE | 11 2021 006 542 T5 | 10/2023 |

(Continued)

OTHER PUBLICATIONS

International Seatch Report dated Sep. 7, 2021 for Application No. PCT/JP2021/026484 with an English translation.

(Continued)

*Primary Examiner* — Qutbuddin Ghulamali
(74) *Attorney, Agent, or Firm* — Birch, Stewart, Kolasch & Birch, LLP

(57) ABSTRACT

A positioning system includes: an approximate position calculation unit that calculates an approximate position of a mobile station; a database that stores information indicating a zone in which the mobile station is able to be present, information indicating an anchor to be used in each zone, and information on a communication parameter; a zone judgement unit that judges a zone to which the mobile station belongs based on the approximate position and information in the database; an anchor-to-be-used determination unit that determines an anchor to be used by the mobile station based on the zone and information in the database; a positioning information acquisition unit that acquires positioning information indicating a positional relationship between the determined anchor and the mobile station; and a position calculation unit that calculates a position of the mobile station based on the positioning information and information in the database.

17 Claims, 9 Drawing Sheets

100

101

(58) Field of Classification Search
 USPC ..................................................... 455/456.1
 See application file for complete search history.

(56) References Cited

U.S. PATENT DOCUMENTS

| | | | |
|---|---|---|---|
| 9,351,119 B2 | 5/2016 | Sridhara et al. | |
| 9,491,680 B2 | 11/2016 | Moeglein et al. | |
| 11,320,513 B2 | 5/2022 | Kusumoto et al. | |
| 11,716,702 B2* | 8/2023 | Chen | H04W 64/006 |
| | | | 455/456.1 |
| 2003/0050079 A1* | 3/2003 | Tsunehara | H04W 64/00 |
| | | | 342/450 |
| 2006/0238418 A1 | 10/2006 | Monnerat et al. | |
| 2010/0271186 A1 | 10/2010 | Tanaka et al. | |
| 2023/0194648 A1* | 6/2023 | Miao | H04W 4/025 |
| | | | 455/456.1 |
| 2023/0319777 A1 | 10/2023 | Taira | |
| 2023/0326340 A1 | 10/2023 | Takeyasu et al. | |
| 2024/0098684 A1 | 3/2024 | Umeda et al. | |

FOREIGN PATENT DOCUMENTS

| | | | |
|---|---|---|---|
| DE | 11 2021 006 436 T5 | 11/2023 | |
| JP | 2000-165936 A | 6/2000 | |
| JP | 2003-37862 A | 2/2003 | |
| JP | 2010-256295 A | 11/2010 | |
| JP | 2016-539321 A | 12/2016 | |
| JP | 2018-502276 A | 1/2018 | |
| WO | WO 2020/031550 A1 | 2/2020 | |
| WO | WO 2023/286212 A1 | 1/2023 | |

OTHER PUBLICATIONS

Japanese Office Action dated Dec. 7, 2021 for Application No. 2021-564211 with an English translation.

Japanese Office Action dated Feb. 22, 2022 for Application No. 2021-564211 with an English translation.

German Office Action for German Application No. 112021007655. 8, dated Oct. 29, 2024, with an English translation.

German Office Action for the German Application No. 11 2021 006 542.4, dated Apr. 30, 2024, with an English translation.

3GPP TS 37.355 V16.2.0, Sep. 2020, 3rd Generation Partnership Project; Technical Specification Group Radio Access Network; LTE Positioning Protocol (LPP), Release 16, pp. 1-296.

3GPP TS 38.211 V16.2.0, Jun. 2020, 3rd Generation Partnership Project; Technical Specification Group Radio Access Network; NR; Physical channels and modulation, Release 16, pp. 1-131.

International Search Report (PCT/ISA/210) issued for PCT/JP2021/005735 mailed on Mar. 30, 2021.

* cited by examiner

POSITIONING SYSTEM

100

101

·UPPER LAYER
·APPLICATION

110 POSITIONING CONTROL UNIT

112 APPROXIMATE POSITION CALCULATION UNIT

111 LOCUS STORAGE UNIT

113 Zone JUDGEMENT UNIT

114 ANCHOR-TO-BE-USED DETERMINATION UNIT

116 POSITIONING INFORMATION ACQUISITION UNIT

117 POSITION CALCULATION UNIT

115 DATABASE

·UPPER LAYER
·APPLICATION

FIG.3

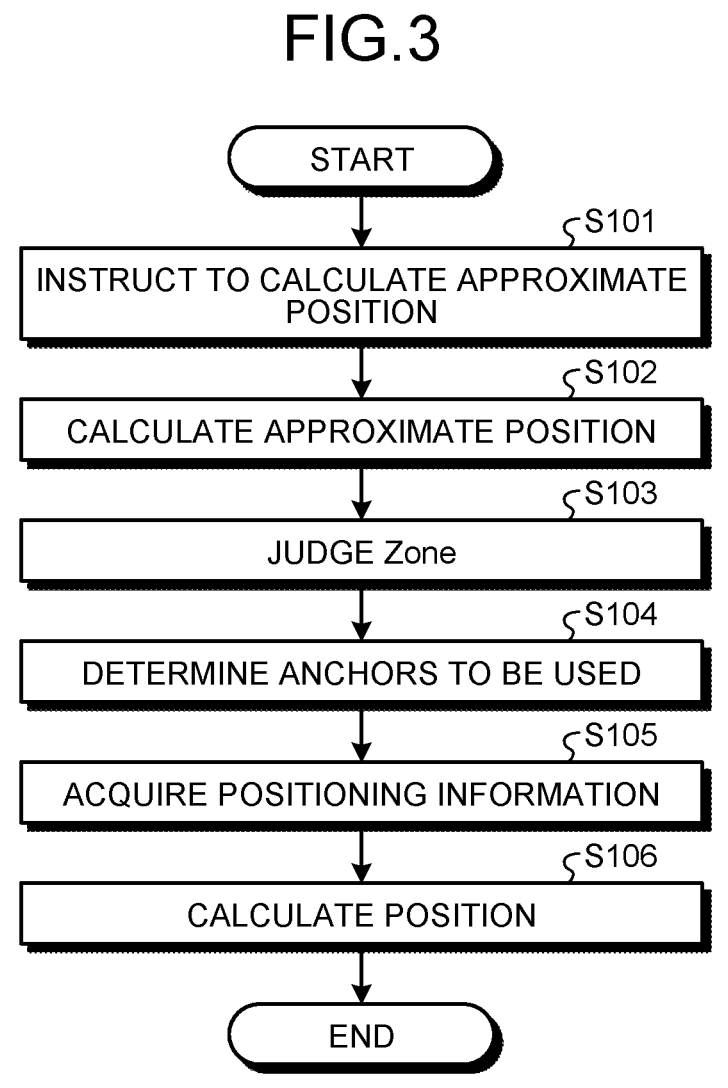

```
        ┌──────────────┐
        │    START     │
        └──────────────┘
               │
               ▼                    ⌐S101
┌─────────────────────────────────────────┐
│ INSTRUCT TO CALCULATE APPROXIMATE         │
│              POSITION                     │
└─────────────────────────────────────────┘
               │
               ▼                    ⌐S102
┌─────────────────────────────────────────┐
│     CALCULATE APPROXIMATE POSITION        │
└─────────────────────────────────────────┘
               │
               ▼                    ⌐S103
┌─────────────────────────────────────────┐
│              JUDGE Zone                   │
└─────────────────────────────────────────┘
               │
               ▼                    ⌐S104
┌─────────────────────────────────────────┐
│      DETERMINE ANCHORS TO BE USED         │
└─────────────────────────────────────────┘
               │
               ▼                    ⌐S105
┌─────────────────────────────────────────┐
│      ACQUIRE POSITIONING INFORMATION      │
└─────────────────────────────────────────┘
               │
               ▼                    ⌐S106
┌─────────────────────────────────────────┐
│           CALCULATE POSITION              │
└─────────────────────────────────────────┘
               │
               ▼
        ┌──────────────┐
        │     END      │
        └──────────────┘
```

FIG.5

| ANCHOR IDENTIFICATION INFORMATION | COORDINATE | COMMUNICATION PARAMETER |
|---|---|---|
| 1 | $(X_1, Y_1, Z_1)$ | Cell ID (Cell Global Identity), CENTER FREQUENCY, FREQUENCY BANDWIDTH, SYNCHRONIZATION SIGNAL (PSS, SSS) INFORMATION, ⋯ IN CASE OF SYSTEM IN COMPLIANCE WITH 3GPP |
| 2 | $(X_2, Y_2, Z_2)$ | CHANNEL NUMBER, STS PACKET CONFIGURATION INFORMATION, PRF Mode, PREAMBLE CODE, SFD FIELD CONFIGURATION INFORMATION, PHR PARAMETER, STS FIELD CONFIGURATION INFORMATION, MAC ADDRESS, ⋯ IN CASE OF SYSTEM IN COMPLIANCE WITH IEEE 802.15.4 |
| ... | | |

FIG.6

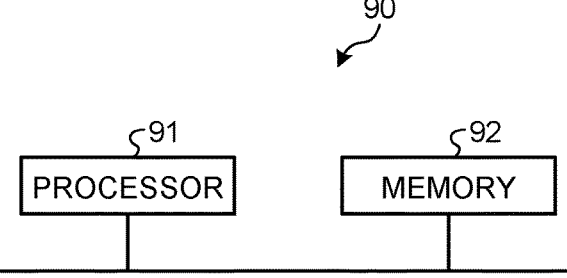

90

| 91 | 92 |
|---|---|
| PROCESSOR | MEMORY |

POSITIONING SYSTEM, POSITIONING NETWORK DEVICE, CONTROL CIRCUIT, STORAGE MEDIUM, AND POSITIONING METHOD

CROSS-REFERENCE TO RELATED APPLICATION

This application is a continuation application of International Application PCT/JP2021/005735, filed on Feb. 16, 2021, and designating the U.S., the entire contents of which are incorporated herein by reference.

BACKGROUND OF THE INVENTION

1. Field of the Invention

The present disclosure relates to a positioning system that measures the position of a mobile station, a positioning network device, a control circuit, a storage medium, and a positioning method.

2. Description of the Related Art

In recent years, there is an increasing need for accurate measurement of the position of a mobile body and use thereof as an application. As an example, in autonomous driving of a vehicle, the vehicle is guided to a destination by ascertaining an accurate position of the vehicle on a road, and performing lane changes while collating with a road map. An automatic guided vehicle (AGV) in a factory is a system having a similar concept, and utilizes information on the position of the vehicle in order to accurately deliver a cargo loaded thereon to a destination in the factory.

An autonomous driving system used in a wide outdoor area and the like have utilized a global navigation satellite system (GNSS) represented by a global positioning system (GPS) satellite. GNSS can provide positioning services in a wide area, but has a problem that positioning cannot be performed in underground, tunnels, under elevated structures, indoor parking lots, and the like where satellites cannot be visually recognized. With respect to such a problem, there have been appearing in recent years infrastructure-utilizing positioning services using base stations of mobile phone systems, wireless local area network (LAN) access points, and near field communication such as Bluetooth (registered trademark).

For example, Japanese Translation of PCT International Application Laid-open No. 2018-502276 discloses a technique in which base stations disposed in a wide area are utilized, a base station group within a certain range is determined as a first set on the basis of an estimated position of a mobile device, the amount of interference is estimated between the base stations of the set on the basis of parameters such as a time of a positioning reference signal and a transmission position on a frequency axis, a base station to be used for positioning is determined on the basis of a result of the estimation, and the position of the mobile device is calculated.

With a rapid increase in wireless utilization applications, the shortage of frequency resources is a problem. In addition to demands for conventional data communication, applications that utilize radio signals for positioning, sensing, and the like also increase, and an efficient positioning method and a radio utilization method are required.

However, according to the conventional technique, it is premised that a public wireless infrastructure is utilized. In the conventional technique, a candidate base station group and a candidate transmission station group to be used for positioning are extracted on the basis of an approximate position of the mobile device by utilizing a database or the like, but thereafter, it is necessary to acquire various radio parameters by connecting to each base station or issuing probe information, to narrow down radio base stations to be actually used for positioning, and to execute positioning of the mobile device. Therefore, positioning processing delays due to narrowing down of target base stations and radio resources are consumed, which is a problem.

SUMMARY OF THE INVENTION

In order to solve the above-described problems and achieve the object, a positioning system according to the present disclosure includes: an approximate position calculation unit to calculate an approximate position of a mobile station; a database to store information indicating a geographical position of a zone in which the mobile station is able to be present, information indicating an anchor to be used for positioning of the mobile station in each zone, and information on a communication parameter necessary for the mobile station to communicate with the anchor or measure a positioning signal from the anchor; and a zone judgement unit to judge a zone to which the mobile station belongs on a basis of an approximate position of the mobile station and information stored in the database. The positioning system includes: an anchor-to-be-used determination unit to determine an anchor to be used by the mobile station for communication or measurement of a positioning signal on a basis of a zone to which the mobile station belongs and information stored in the database; a positioning information acquisition unit to acquire positioning information indicating a positional relationship between the determined anchor and the mobile station by communication with the determined anchor or measurement of the positioning signal from the determined anchor; and a position calculation unit to calculate a position of the mobile station on a basis of the positioning information and information stored in the database.

BRIEF DESCRIPTION OF THE DRAWINGS

FIG. 3 is a flowchart illustrating an operation of the positioning system according to the first embodiment;

FIG. 5 is a diagram illustrating an example of anchor information stored in the database according to the first embodiment;

FIG. 6 is a diagram illustrating an example configuration of a processing circuitry in a case where a processing circuitry included in the positioning system according to the first embodiment is realized by a processor and a memory;

DETAILED DESCRIPTION OF THE PREFERRED EMBODIMENTS

Hereinafter, a positioning system, a positioning network device, a control circuit, a storage medium, and a positioning method according to each embodiment of the present disclosure will be described in detail with reference to the drawings.

First Embodiment

Figure 1:
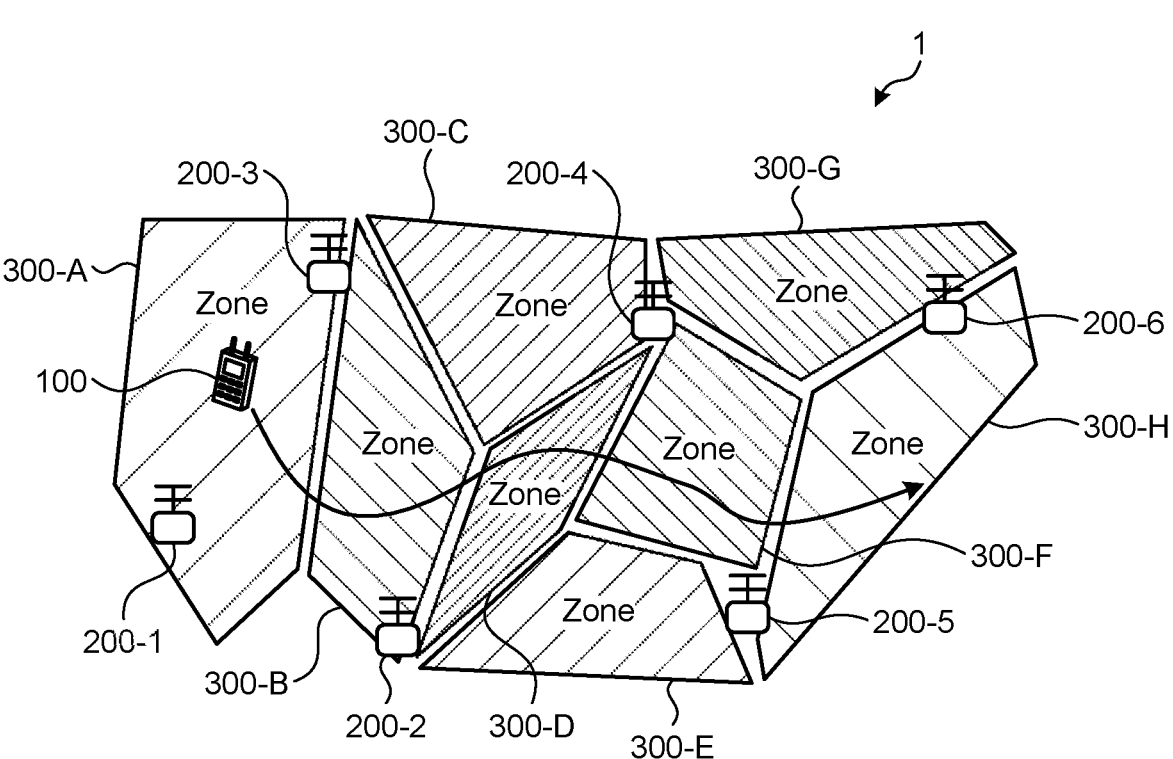
FIG. 1 is a diagram illustrating an example configuration of a wireless communication system according to a first embodiment.

In the present embodiment, base stations, access points, transmission stations, tags, and the like installed as a positioning infrastructure are collectively referred to as anchors. In addition, wireless stations, mobile devices, and the like, of which the positions are to be estimated will be collectively referred to as mobile stations. FIG. 1 is a diagram illustrating an example configuration of a wireless communication system 1 according to the first embodiment. The wireless communication system 1 includes a mobile station 100 and anchors 200-1 to 200-6. The mobile station 100 performs positioning of the mobile station 100. The anchors 200-1 to 200-6 are installed around the mobile station 100. In the following description, the anchors 200-1 to 200-6 may be each referred to as an anchor 200 when no distinction is made among them. In the example in FIG. 1, the anchors 200-1 to 200-6, i.e., six anchors 200 are installed. Zones 300-A to 300-H are virtual zones, and represent specific areas that are divided geographically, to be more specific, planarly or spatially. In the following description, the Zones 300-A to 300-H may be each referred to as a Zone 300 when no distinction is made among them. In the example in FIG. 1, the Zones 300-A to 300-H, i.e., eight Zones 300 are illustrated. Also, "Zone" may be written as "zone".

The mobile station 100 judges the Zone 300 to which the mobile station 100 currently belongs on the basis of an approximate position of the mobile station 100, and performs precise positioning of the mobile station 100 by communication with the anchors 200 associated with the Zone 300 to which the mobile station 100 currently belongs or measurement of positioning signals from the anchors 200. Note that the positioning by communication is assumed to be ranging by propagation time measurement using a time stamp assumed in the Institute of Electrical and Electronics Engineers (IEEE) 802.15.4z standard or the like. The wireless communication system 1 also includes a system having a configuration in which the mobile station 100 requests, by communication, the anchors 200 to transmit positioning signals.

As the background of the present embodiment, there is a fact that a positioning infrastructure utilizing radio technology is now able to be built as private one. Previous positioning infrastructures utilize public systems such as GNSS and mobile phone systems. Therefore, it is difficult to perform a process specialized for a mobile station that requires positioning information. On the other hand, in recent years, systems are being developed which allow mobile communication systems to be installed as private ones, for example, local 5th Generation (5G) and shared eXtended Global Platform (XGP) which is private Long Term Evolution (LTE). In such systems, a mobile station and an infrastructure device are owned by the same owner, and information useful for positioning, such as an accurate installation position of a base station and enormous setting parameters, can be acquired in advance and used as known information. In addition, a moving route of the mobile station is limited to a specific application of a specific user, and thus is limited to a certain extent. Furthermore, it is also possible to acquire the state of radio wave propagation along the moving route by using a special test mode or the like to create an accurate heat map.

The present embodiment assumes the use of the private positioning infrastructure as described above, and aims to realize efficient positioning by actively utilizing information on various radio parameters. As an example, in order to perform positioning at a specific position, that is, in a specific Zone 300, as illustrated in FIG. 1, it is also possible to construct a database indicating with which anchor 200 communication is performed to realize highly accurate positioning. In an actual environment, shielding by a structure, power fluctuation due to multipath, and the like also occur, so that the anchor 200 close in distance or the anchor 200 with high power is not necessarily suitable for positioning. In general, the anchor 200 with less reflected waves and for which a line-of-sight is ensured should be chosen. Therefore, the shape of each Zone 300 in FIG. 1 is expected to be not simple but complicated.

Figure 2:
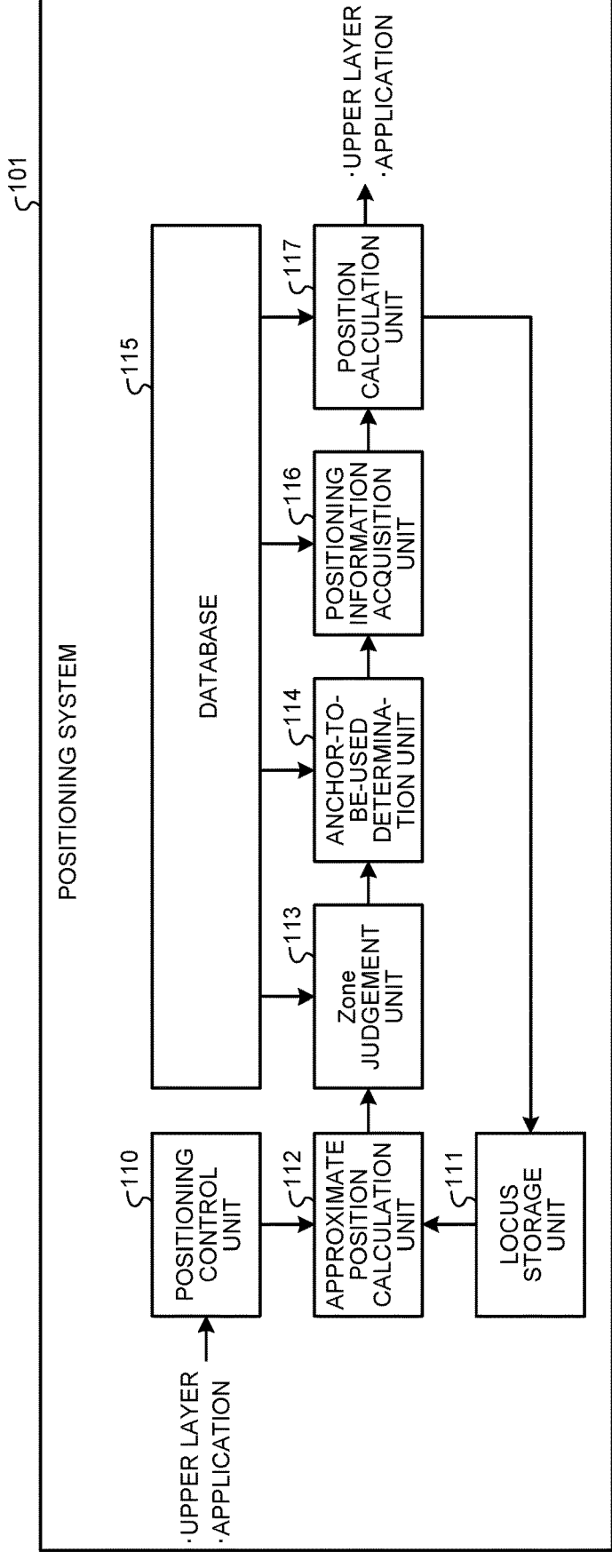
FIG. 2 is a block diagram illustrating an example configuration of a positioning system included in a mobile station according to the first embodiment.

A specific configuration and operation of the mobile station 100 that measures the position of the mobile station 100 will be described. FIG. 2 is a block diagram illustrating an example configuration of a positioning system 101 included in the mobile station 100 according to the first embodiment. The mobile station 100 includes the positioning system 101 that measures the position of the mobile station 100. The positioning system 101 includes a positioning control unit 110, a locus storage unit 111, an approximate position calculation unit 112, a zone judgement unit 113, an anchor-to-be-used determination unit 114, a database 115, a positioning information acquisition unit 116, and a position calculation unit 117. That is, in the first embodiment, the positioning control unit 110, the locus storage unit 111, the approximate position calculation unit 112, the zone judgement unit 113, the anchor-to-be-used determination unit 114, the database 115, the positioning information acquisition unit 116, and the position calculation unit 117 are mounted on the mobile station 100. FIG. 3 is a flowchart illustrating an operation of the positioning system 101 according to the first embodiment.

When acquiring a positioning request from an upper layer or an application, the positioning control unit 110 instructs the approximate position calculation unit 112 to calculate an approximate position of the mobile station 100 (step S101).

The approximate position calculation unit 112 calculates the approximate position of the mobile station 100 by some method (step S102). For example, when continuous or periodic positioning is performed, the approximate position calculation unit 112 may use position information at a time of previous positioning stored in the locus storage unit 111. Alternatively, the approximate position calculation unit 112 may use a method such as acquisition of a surrounding situation by a camera, position collation with various markers, or position collation with a magnetic marker by a magnetic sensor. The approximate position calculation unit

112 outputs information on the calculated approximate position to the zone judgement unit 113.

Figure 4:
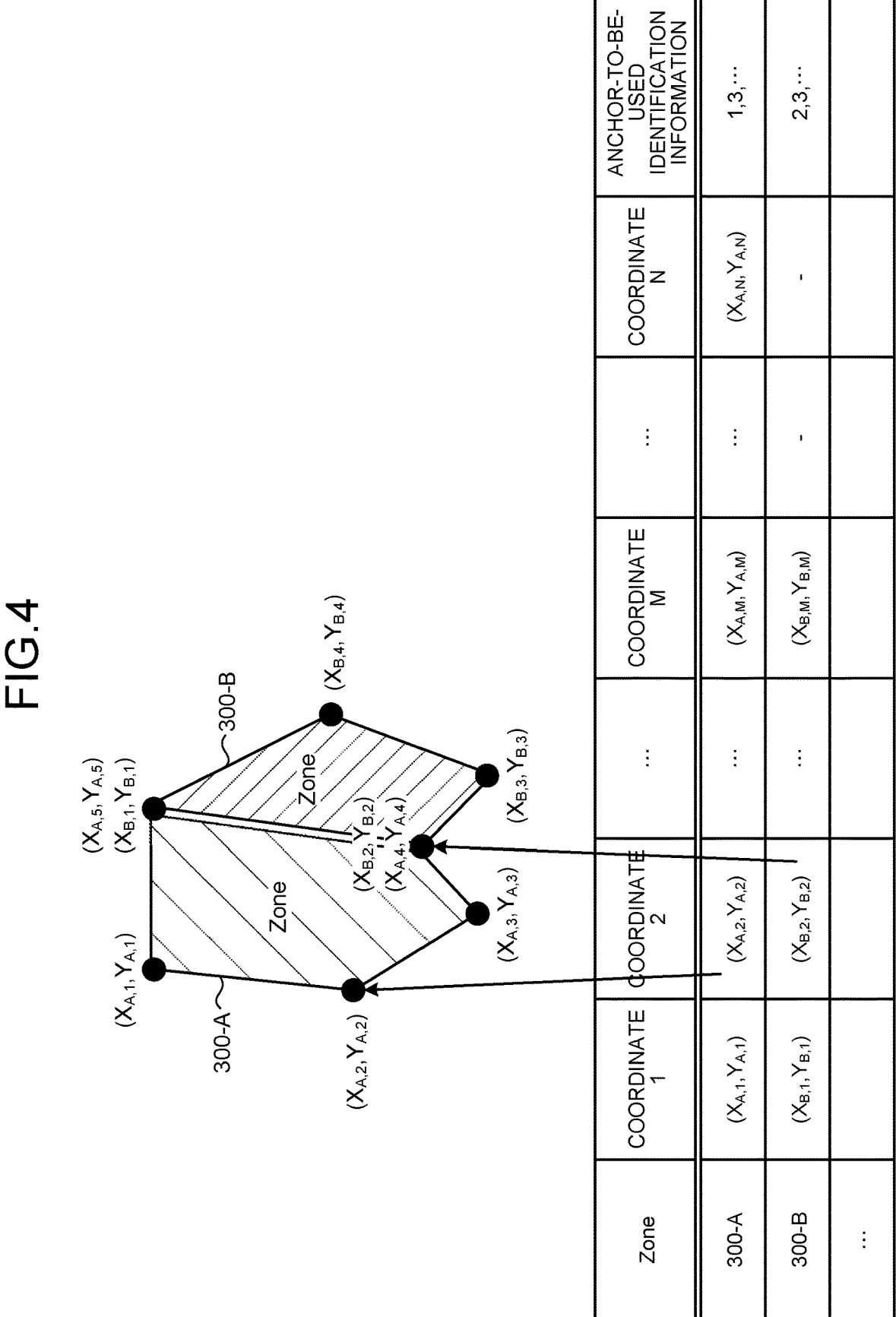
FIG. 4 is a diagram illustrating an example of Zone information stored in a database according to the first embodiment.

The zone judgement unit 113 acquires zone information from the database 115. FIG. 4 is a diagram illustrating an example of zone information stored in the database 115 according to the first embodiment. The zone information includes at least information indicating a geographical position of each of the Zones 300. FIG. 4 illustrates an example of a case where the Zones 300-A and 300-B are formed on a plane, and a notification of (X,Y) coordinates of polygon vertices is performed. The Zones 300 each have any shape, and the number of coordinates required for representation may be different for each of the zones 300. In addition, in a case where the zones 300 are set spatially, a notification of three-dimensional coordinates of (X,Y,Z) is performed. The case where the Zones 300 are set spatially includes a case in which the zones extend over a plurality of floors. The zone judgement unit 113 judges the Zone 300 to which the mobile station 100 belongs on the basis of the information on the approximate position acquired from the approximate position calculation unit 112 and the zone information acquired from the database 115 (step S103). The zone judgement unit 113 outputs information on the Zone 300 to which the mobile station 100 belongs to the anchor-to-be-used determination unit 114.

The anchor-to-be-used determination unit 114 determines the anchors 200 to be used by the mobile station 100 for communication or measurement of positioning signals on the basis of the information on the Zone 300 to which the mobile station 100 belongs acquired from the zone judgement unit 113 and the zone information acquired from the database 115 (step S104). The anchor-to-be-used determination unit 114 determines the anchors 200 to be used for positioning, for example, by using anchor-to-be-used identification information included in the zone information in the database 115 illustrated in FIG. 4. The anchor-to-be-used identification information included in the zone information is a list prepared in advance of the anchors 200 to be used when positioning is performed in each of the Zones 300. The anchor-to-be-used determination unit 114 outputs identification information of the determined anchors 200, for example, anchor numbers in the example of FIG. 1, to the positioning information acquisition unit 116.

On the basis of the identification information of the anchors 200 to be used acquired from the anchor-to-be-used determination unit 114 and anchor information acquired from the database 115, the positioning information acquisition unit 116 acquires a communication parameter for communicating with each of the anchors 200. FIG. 5 is a diagram illustrating an example of anchor information stored in the database 115 according to the first embodiment. The anchor information includes, for each piece of anchor identification information, the position of the anchor 200 and a communication parameter for communicating with the anchor 200 or measuring a positioning signal from the anchor 200. The position of the anchor 200 may be absolute coordinates such as latitude and longitude, or may be a relative value based on a specific point in, for example, a building or a space.

For example, in a case where the wireless communication system 1 is a system in compliance with the 3rd Generation Partnership Project (3GPP), the communication parameter includes a cell ID, for example, a cell global identity (CGI), as information for identifying the anchor 200. In addition, examples of the communication parameter include, as radio signal specifications, a center frequency, a frequency bandwidth, a subcarrier width, a cyclic prefix (CP) length, $N_{ID}^{cell}=3N_{ID}^{(1)}+N_{ID}^{(2)}$ which is synchronization signal information based on 3GPP standard TS 38.211, a port number, scramble IDs for generating types of demodulation reference signals (DMRSs), positioning reference signal (PRS) resource allocation information, and a downlink PRS sequence ID. PRS-related information is diverse and cannot be fully described, but examples thereof include, as radio signal specifications, downlink (DL)-PRS-ID-Info, New Radio (NR)-DL-PRS-AssistanceData, NR-DL-PRS-Beam-Info, NR-DL-PRS-Info, NR-DL-PRS-ResourceID, NR-DL-PRS-ResourceSetID, and NR-SelectedDL-PRS-IndexList described in TS 37.355-g20 which is information of which notification is performed by an upper layer in a 3GPP system. The radio signal specifications include one or more thereof.

In a case where the wireless communication system 1 is a system in compliance with IEEE 802.15.4 series, the communication parameter includes, as information for identifying the anchor 200, unique information of the anchor 200 such as a media access control (MAC) address. In addition, examples of the communication parameter include, as radio signal specifications, a channel number, scrambled timestamp sequence (STS) packet configuration information, a pulse repetition frequency (PRF) mode, a preamble code, start frame delimiter (SFD) field configuration information, a physical header (PHR) parameter, and STS field configuration information such as a random number seed. Other than the above, in general, a wireless station ID such as a service set identifier (SSID) of a wireless LAN, frequency information such as a channel number, a center frequency, and a bandwidth, and radio signal specifications such as a modulation scheme, an error correction scheme, synchronization signal information, and a scrambling seed correspond to the communication parameter. The radio signal specifications include one or more thereof.

As described above, the database 115 stores information indicating the geographical position of the Zone 300 to which the mobile station 100 is able to belong, that is, in which the mobile station 100 is able to be present, information indicating the anchors 200 to be used for positioning of the mobile station 100 in each Zone 300, and information on communication parameters necessary for the mobile station 100 to communicate with the anchors 200 or measure positioning signals from the anchors 200.

With the use of the above-described communication parameter included in the anchor information acquired from the database 115, the positioning information acquisition unit 116 communicates with each of the anchors 200 of a designated anchor group determined by the anchor-to-be-used determination unit 114 or measures a positioning signal from each of the anchors 200 of the designated anchor group, and acquires positioning information (step S105). The positioning information is assumed to be information indicating a positional relationship between each of the anchors 200 and the mobile station 100, such as a distance between each of the anchors 200 and the mobile station 100, an azimuth, and a power value, but is not limited herein. The positioning information acquisition unit 116 outputs the acquired positioning information to the position calculation unit 117.

The position calculation unit 117 calculates an accurate position of the mobile station 100 on the basis of the positioning information acquired from the positioning information acquisition unit 116 and the information on the position of each of the anchors 200 included in the anchor information acquired from the database 115 (step S106). For example, if accurate distances to three anchors 200 can be obtained, the position calculation unit 117 can accurately specify the position of the mobile station 100 on a plane by trilateration. The position calculation unit 117 outputs information on the calculated position of the mobile station 100 to a higher layer such as an upper layer or an application, and stores the information in the locus storage unit 111 together with related information such as a positioning time.

The database 115 used in the present embodiment will be described. As described above, in a case where an installer of a positioning infrastructure and an operator of a positioning application are the same entity, the positioning application can use the information on the position of each of the anchors 200 and the communication parameters. In order to effectively use these pieces of information, a user who is the installer of the positioning infrastructure and the operator of the positioning application creates the database 115 including the zone information illustrated in FIG. 4 and the anchor information illustrated in FIG. 5 in advance. That is, the user measures a radio wave propagation state between each of the anchors 200 and the mobile station 100 along an assumed moving route of the mobile station 100, and chooses the anchors 200 in each of which (1) a line-of-sight is ensured, (2) received power is high, and (3) the number of multipaths is small. At that time, the user selects the minimum number of anchors 200 required for positioning and the anchor 200 as a spare. This is because there is a possibility that a communication path is interrupted due to temporary shielding in an actual operation environment. The Zone 300 is obtained by grouping places where the same anchors 200 as candidates are selected. In other words, the same anchors 200 should be used for positioning of the mobile station 100 at all points belonging to the same Zone 300.

When the database 115 also stores setting parameters of a wireless infrastructure constituting the anchors 200, that is, the positioning infrastructure, the positioning system 101 can acquire information required for positioning in a short time without performing sensing of broadcast information. In the positioning system 101, if the information to be stored is semi-static, the database 115 may store the information in advance, for example, may write the information in a memory. In the positioning system 101, if the information to be stored is semi-dynamic, the database 115 may acquire, i.e., download the information via a communication line and store the information before starting use of the mobile station 100.

Next, a hardware configuration of the positioning system 101 will be described. In the positioning system 101, the positioning control unit 110, the locus storage unit 111, the approximate position calculation unit 112, the zone judgement unit 113, the anchor-to-be-used determination unit 114, the database 115, the positioning information acquisition unit 116, and the position calculation unit 117 are realized by a processing circuitry. The processing circuitry may be a processor that executes a program stored in a memory and the memory, or may be dedicated hardware. The processing circuitry is also referred to as a control circuit.

FIG. 6 is a diagram illustrating an example configuration of a processing circuitry 90 in a case where a processing circuitry included in the positioning system 101 according to the first embodiment is realized by a processor 91 and a memory 92. The processing circuitry 90 illustrated in FIG. 6 is a control circuit, and includes the processor 91 and the memory 92. In a case where the processing circuitry 90 is constituted with the processor 91 and the memory 92, functions of the processing circuitry 90 are realized by software, firmware, or a combination of software and firmware. The software or the firmware is described as a program and stored in the memory 92. In the processing circuitry 90, the processor 91 reads and executes the program stored in the memory 92, thereby realizing the functions. That is, the processing circuitry 90 includes the memory 92 for storing a program with which a process of the positioning system 101 is executed as a result. It can also be said that this program is a program for causing the positioning system 101 to execute the functions realized by the processing circuitry 90. This program may be provided by a storage medium having the program stored therein, or may be provided by other means such as a communication medium.

It can also be said that the program is a program that causes the positioning system 101 to execute: a first step performed by the approximate position calculation unit 112 of calculating an approximate position of the mobile station 100; a second step performed by the zone judgement unit 113 of judging the Zone 300 to which the mobile station 100 belongs on the basis of the approximate position of the mobile station 100 and the information stored in the database 115; a third step performed by the anchor-to-be-used determination unit 114 of determining the anchors 200 to be used by the mobile station 100 for communication or measurement of positioning signals on the basis of the Zone 300 to which the mobile station 100 belongs and the information stored in the database 115; a fourth step performed by the positioning information acquisition unit 116 of acquiring positioning information indicating a positional relationship between each of the determined anchors 200 and the mobile station 100 by communication with the determined anchors 200 or measurement of positioning signals from the determined anchors 200; and a fifth step performed by the position calculation unit 117 of calculating the position of the mobile station 100 on the basis of the positioning information and the information stored in the database 115.

Here, the processor 91 is, for example, a central processing unit (CPU), a processing device, an arithmetic device, a microprocessor, a microcomputer, or a digital signal processor (DSP). The memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disk, or a digital versatile disc (DVD).

Figure 7:
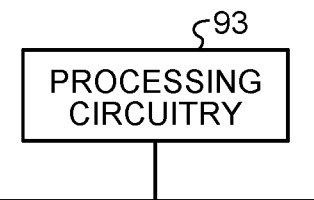
FIG. 7 is a diagram illustrating an example of a processing circuitry in a case where the processing circuitry included in the positioning system according to the first embodiment is configured with dedicated hardware.

FIG. 7 is a diagram illustrating an example of a processing circuitry 93 in a case where the processing circuitry included in the positioning system 101 according to the first embodiment is configured with dedicated hardware. The processing circuitry 93 illustrated in FIG. 7 corresponds to, for example, a single circuit, a composite circuit, a programmed processor, a parallel programmed processor, an application specific integrated circuit (ASIC), a field programmable gate array (FPGA), or a combination thereof. A part of the processing circuitry may be realized by dedicated hardware and another part thereof may be realized by software or firmware. Thus, the processing circuitry can realize each of the above-described functions by dedicated hardware, software, firmware, or a combination thereof.

As described above, according to the present embodiment, the positioning system 101 calculates the approximate position of the mobile station 100, judges the Zone 300 to which the mobile station 100 belongs by using the information stored in the database 115, determines the anchors 200 to be used by the mobile station 100 for positioning, and acquires the positioning information to thereby calculate the position of the mobile station 100. Consequently, the positioning system 101 can perform positioning of the mobile station 100 with minimum communication, and can obtain a positioning result with low delay while reducing consumption of radio resources.

Second Embodiment

In the first embodiment, the mobile station 100 includes the positioning system 101. In a second embodiment, a case will be described where a positioning system includes a mobile station and a positioning network device installed on the ground.

Figure 8:
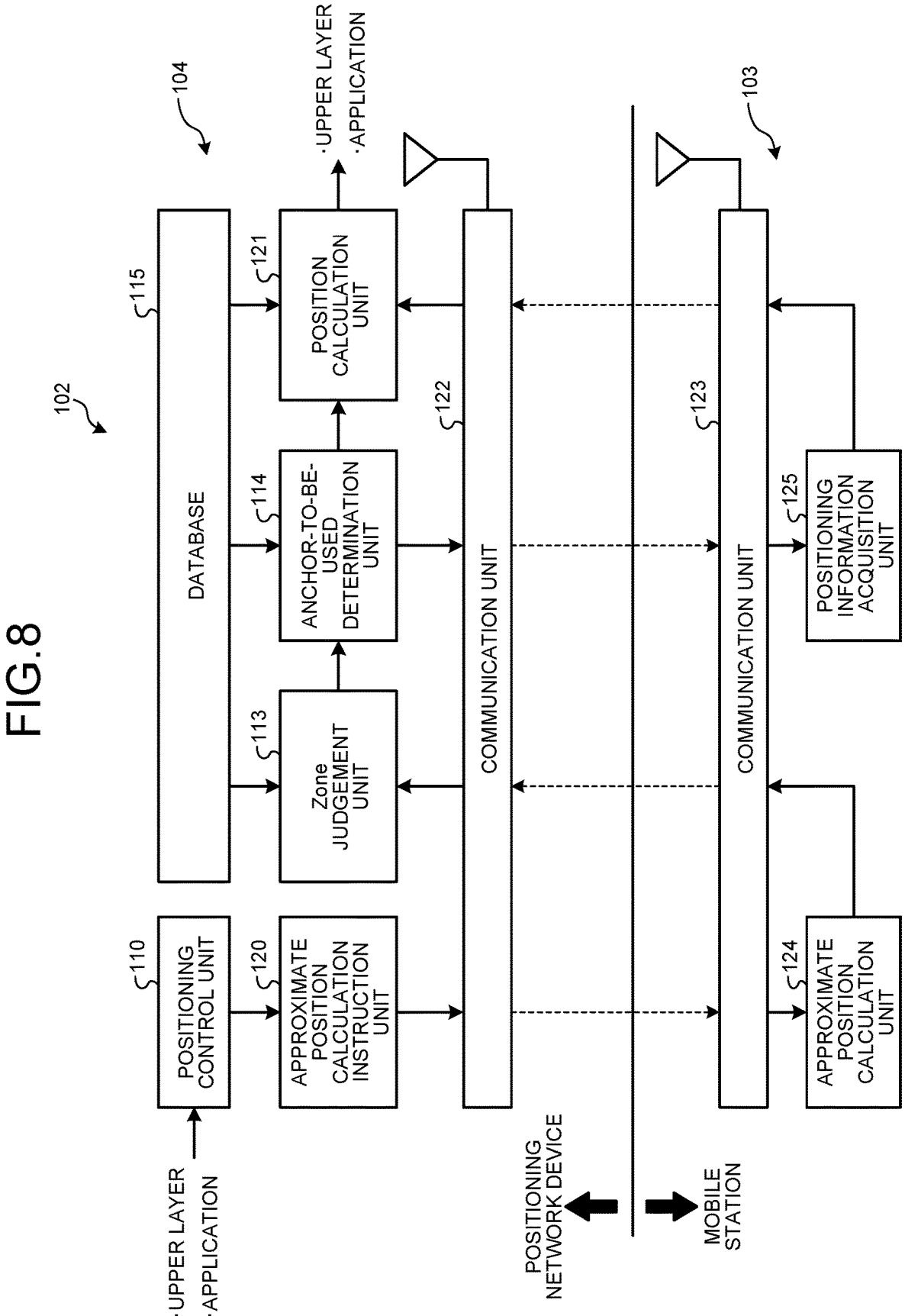
FIG. 8 is a block diagram illustrating an example configuration of a positioning system according to a second embodiment.
Figure 9:
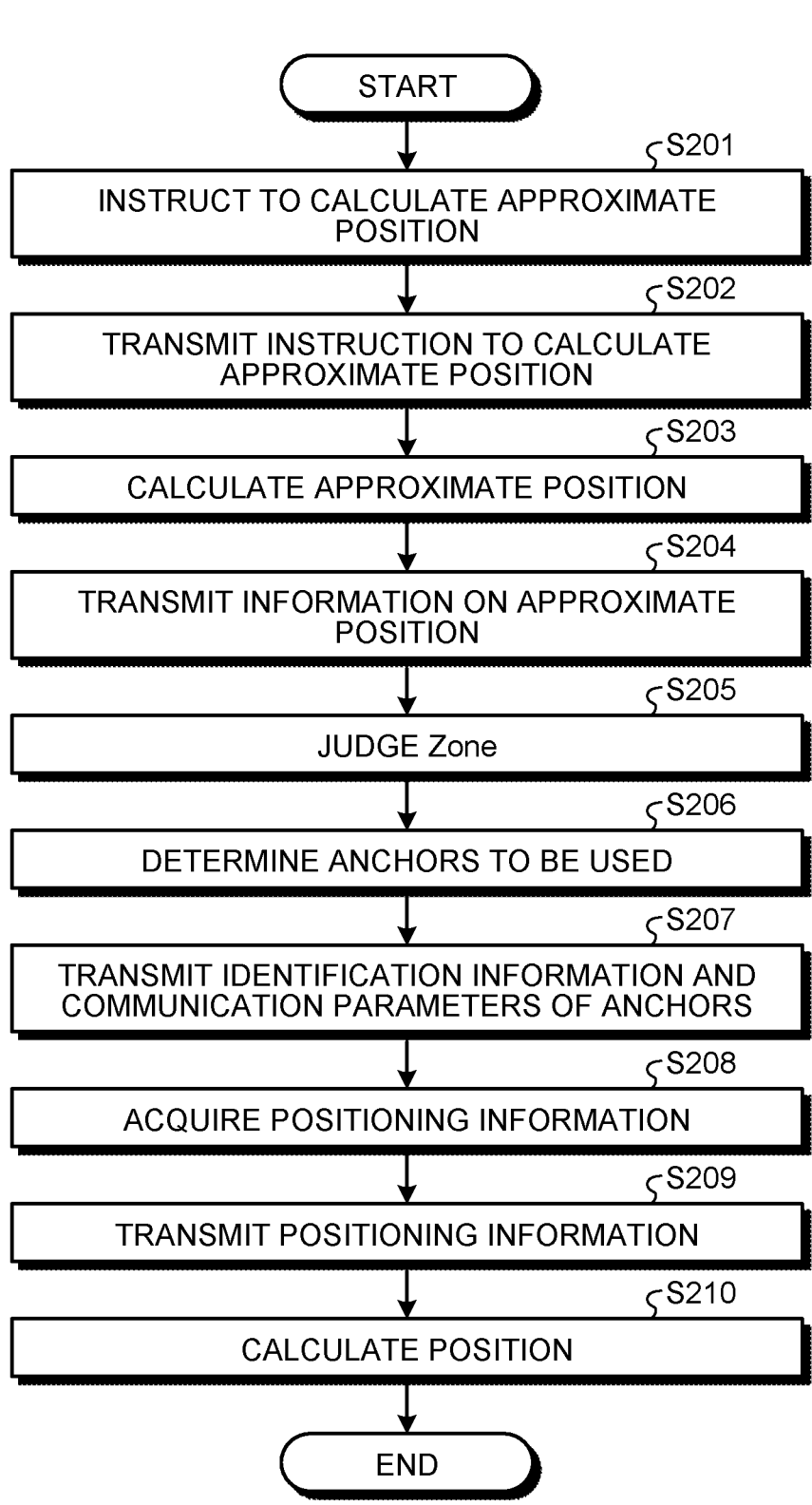
FIG. 9 is a flowchart illustrating an operation of the positioning system according to the second embodiment.

FIG. 8 is a block diagram illustrating an example configuration of a positioning system 102 according to the second embodiment. The positioning system 102 includes a mobile station 103 and a positioning network device 104. The positioning system 102 is configured to control positioning of the mobile station 103 and calculate the position of the mobile station 103 by the positioning network device 104. The positioning network device 104 is installed on the ground and may be referred to as a location server. The mobile station 103 includes a communication unit 123, an approximate position calculation unit 124, and a positioning information acquisition unit 125. The positioning network device 104 includes the positioning control unit 110, an approximate position calculation instruction unit 120, the zone judgement unit 113, the anchor-to-be-used determination unit 114, the database 115, a position calculation unit 121, and a communication unit 122. That is, in the second embodiment, the communication unit 123, the approximate position calculation unit 124, and the positioning information acquisition unit 125 are mounted on the mobile station 103. The positioning control unit 110, the approximate position calculation instruction unit 120, the zone judgement unit 113, the anchor-to-be-used determination unit 114, the database 115, the position calculation unit 121, and the communication unit 122 are mounted on the positioning network device 104. FIG. 9 is a flowchart illustrating an operation of the positioning system 102 according to the second embodiment.

When acquiring a positioning request from an upper layer or an application, the positioning control unit 110 instructs the approximate position calculation instruction unit 120 to calculate an approximate position of the mobile station 103 (step S201).

The approximate position calculation instruction unit 120 communicates with the mobile station 103 via the communication unit 122, and transmits an instruction to calculate the approximate position of the mobile station 103 to the approximate position calculation unit 124 via the communication unit 123 of the mobile station 103 (step S202).

The approximate position calculation unit 124 calculates the approximate position of the mobile station 103 by some method (step S203). The method for calculating the approximate position of the mobile station 103 by the approximate position calculation unit 124 is similar to the method for calculating the approximate position of the mobile station 100 by the approximate position calculation unit 112 of the first embodiment. The approximate position calculation unit 124 transmits information on the calculated approximate position to the zone judgement unit 113 of the positioning network device 104 via the communication unit 123 and the communication unit 122 of the positioning network device 104 (step S204).

The zone judgement unit 113 judges the Zone 300 to which the mobile station 103 belongs on the basis of the information on the approximate position acquired from the approximate position calculation unit 124 of the mobile station 103 and the zone information acquired from the database 115 (step S205). The zone judgement unit 113 outputs information on the Zone 300 to which the mobile station 103 belongs to the anchor-to-be-used determination unit 114.

The anchor-to-be-used determination unit 114 determines the anchors 200 to be used by the mobile station 103 for communication or measurement of positioning signals on the basis of the information on the Zone 300 to which the mobile station 103 belongs acquired from the zone judgement unit 113 and the zone information acquired from the database 115 (step S206). The anchor-to-be-used determination unit 114 outputs the identification information of the determined anchors 200 to the position calculation unit 121. In addition, the anchor-to-be-used determination unit 114 transmits the identification information of the determined anchors 200 and the communication parameter for each of the anchors 200 to the positioning information acquisition unit 125 of the mobile station 103 via the communication unit 122 and the communication unit 123 of the mobile station 103 (step S207).

On the basis of the information acquired from the anchor-to-be-used determination unit 114 of the positioning network device 104, the positioning information acquisition unit 125 communicates with each of the anchors 200 of a designated anchor group determined by the anchor-to-be-used determination unit 114, or measures a positioning signal from each of the anchors 200 of the designated anchor group, and acquires positioning information (step S208). The positioning information is assumed to be information indicating a positional relationship between each of the anchors 200 and the mobile station 103, such as a distance between each of the anchors 200 and the mobile station 103, an azimuth, and a power value, but is not limited herein. A method for communicating with each of the anchors 200 or a method for measuring a positioning signal from each of the anchors 200 performed by the positioning information acquisition unit 125 is similar to the method for communicating with each of the anchors 200 or the method for measuring a positioning signal from each of the anchors 200 performed by the positioning information acquisition unit 116 of the first embodiment. The positioning information acquisition unit 125 transmits the acquired positioning information to the position calculation unit 121 of the positioning network device 104 via the communication unit 123 and the communication unit 122 of the positioning network device 104 (step S209).

The position calculation unit 121 calculates an accurate position of the mobile station 103 on the basis of the positioning information acquired from the positioning information acquisition unit 125 of the mobile station 103 and the position information of each of the anchors 200 included in the anchor information acquired from the database 115 (step S210). The position calculation unit 121 outputs information on the calculated position of the mobile station 103 to a higher layer such as an upper layer or an application.

Next, hardware configurations of the mobile station 103 and the positioning network device 104 constituting the positioning system 102 will be described. In the mobile station 103, the communication unit 123 is a communication device. In the mobile station 103, the approximate position calculation unit 124 and the positioning information acquisition unit 125 are realized by a processing circuitry. In the positioning network device 104, the communication unit 122 is a communication device. In the positioning network device 104, the positioning control unit 110, the approximate position calculation instruction unit 120, the zone judgement unit 113, the anchor-to-be-used determination unit 114, the database 115, and the position calculation unit 121 are realized by a processing circuitry. Similarly to the processing circuitry of the positioning system 101 of the first embodiment, each of the processing circuitries of the mobile station 103 and the positioning network device 104 may be a processor that executes a program stored in a memory and the memory, or may be dedicated hardware.

As described above, according to the present embodiment, the positioning system 102 has the configuration in which the positioning network device 104 includes the database 115, and the function of the mobile station 103 is reduced as compared with the mobile station 100 of the first embodiment. Consequently, the positioning system 102 can obtain an effect similar to that of the first embodiment, and it is also possible to simplify the configuration of the positioning system 102 by reducing the function of the mobile stations 103 present in large number.

Third Embodiment

The positioning system 101 of the first embodiment and the positioning system 102 of the second embodiment can efficiently perform positioning because information on the anchors 200 with which communication is to be performed is obtained from the database 115 on the basis of the approximate position of the mobile station. On the other hand, inconsistency between information stored in the database 115 and an actual communication state becomes a problem. In a third embodiment, a case will be described where inconsistency occurs between information stored in the database 115 and an actual communication state. The third embodiment is applicable to both the positioning system 101 of the first embodiment and the positioning system 102 of the second embodiment, but here, a description will be given using the positioning system 101 of the first embodiment as an example.

Figure 10:
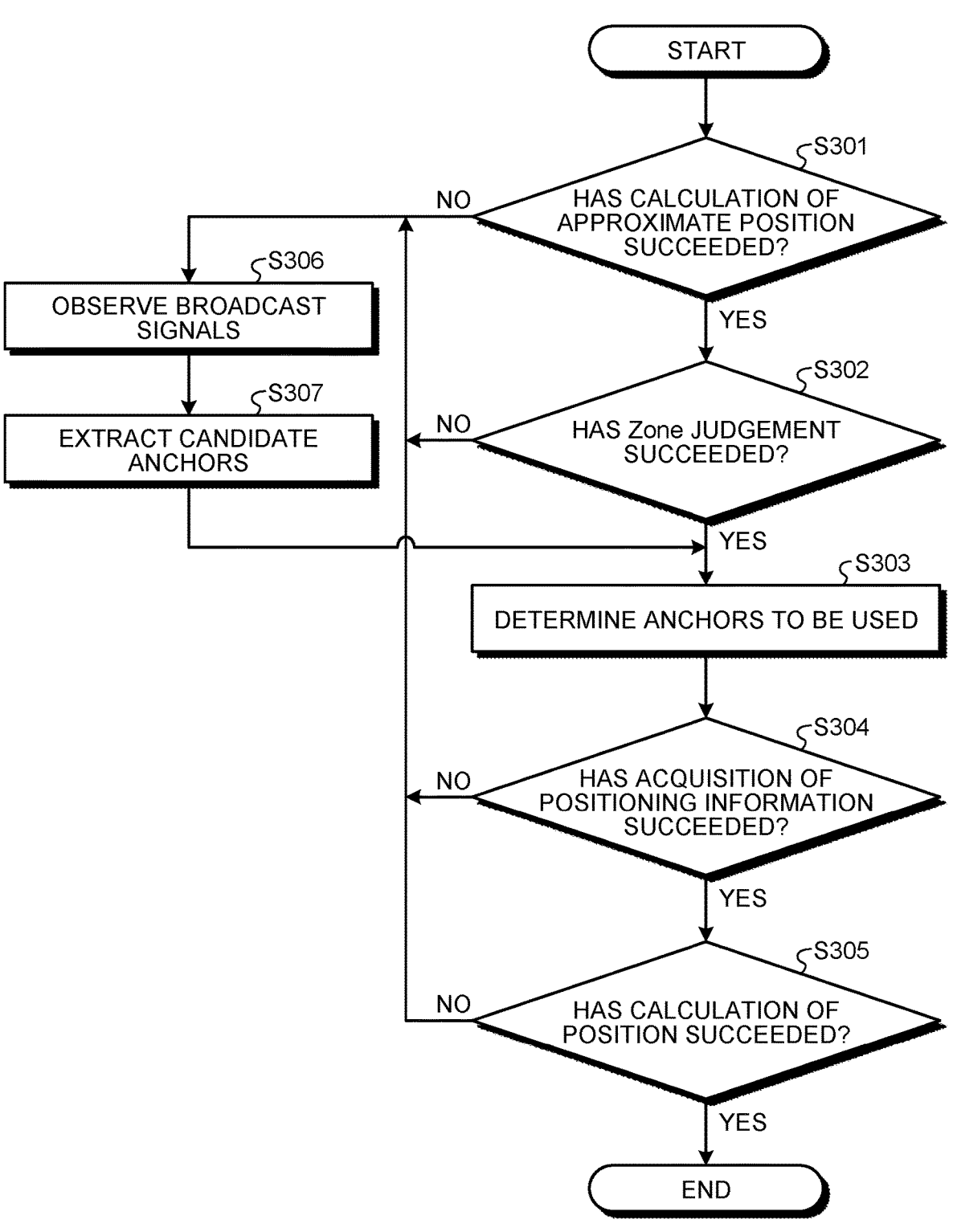
FIG. 10 is a flowchart illustrating an operation in a case where inconsistency occurs between the database and an actual communication state in the positioning system according to a third embodiment.

FIG. 10 is a flowchart illustrating an operation in a case where inconsistency occurs between the database 115 and an actual communication state in the positioning system 101 according to the third embodiment.

When instructed to calculate an approximate position of the mobile station 100 from the positioning control unit 110, the approximate position calculation unit 112 attempts to calculate the approximate position, but may fail in calculation of the approximate position for various reasons, for example, because there is no previously calculated position, because an initial position is not set, and because a magnetic marker is not found. If the positioning system 101 has succeeded in the calculation of the approximate position performed by the approximate position calculation unit 112 (step S301: Yes), the process proceeds to step S302. If the positioning system 101 has failed in the calculation of the approximate position performed by the approximate position calculation unit 112 (step S301: No), the process proceeds to step S306.

When acquiring approximate position information of the mobile station 100 from the approximate position calculation unit 112, the zone judgement unit 113 attempts to judge the Zone 300 to which the mobile station 100 belongs, but may fail in zone judgement, for example, because coordinates corresponding to the approximate position information are out of the scope of the database 115. If the positioning system 101 has succeeded in the zone judgement based on the database 115 performed by the zone judgement unit 113 (step S302: Yes), the process proceeds to step S303. If the positioning system 101 has failed in the zone judgement based on the database 115 performed by the zone judgement unit 113 (step S302: No), the process proceeds to step S306.

The positioning system 101 determines, with the anchor-to-be-used determination unit 114, the anchors 200 to be used for positioning (step S303), and the process proceeds to step S304.

The positioning information acquisition unit 116 attempts to communicate with the anchors 200 or measure positioning signals from the anchors 200 in order to obtain positioning information, but may fail in the communication or the measurement of the positioning signal due to failure of a device, shielding, or other reasons. In the database 115, the anchors 200 to be used are set with some degree of redundancy. However, in a case where the number of anchors 200 with which communication can be performed or of which positioning signals can be measured falls below the number of anchors 200 required for positioning of the mobile station 100, the positioning information acquisition unit 116 cannot perform positioning of the mobile station 100. In such a case, the positioning information acquisition unit 116 judges that communication with the anchors 200 or measurement of the positioning signals from the anchors 200 has failed. If the positioning system 101 has succeeded in the communication with the anchors 200 or the measurement of the positioning signals from the anchors 200, which is considered that acquisition of the positioning information has succeeded (step S304: Yes), the process proceeds to step S305. If the positioning system 101 has failed in the communication with the anchors 200 or the measurement of the positioning signals from the anchors 200, which is considered that acquisition of the positioning information has failed (step S304: No), the process proceeds to step S306.

The position calculation unit 117 attempts to calculate the position of the mobile station 100 by using the positioning information, but may fail in the calculation of the position, for example, because the position of the mobile station 100 deviates from a scheduled moving route or is improbable as compared with the information in the database 115. If the positioning system 101 has succeeded in the calculation of the position of the mobile station 100 performed by the position calculation unit 117 (step S305: Yes), the positioning system 101 outputs information on the calculated position of the mobile station 100 to a higher layer such as an upper layer or an application, and ends the operation. If the positioning system 101 has failed in the calculation of the position of the mobile station 100 performed by the position calculation unit 117 (step S305: No), the process proceeds to step S306.

In a case where the positioning of the mobile station 100 based on the database 115 has failed for some reason, the positioning system 101 shifts to an autonomous mode in which the positioning of the mobile station 100 is autonomously performed without using the database 115. The case where the positioning of the mobile station 100 based on the database 115 has failed for some reason corresponds to any of the above-described cases, i.e., the case of failing in the calculation of the approximate position of the mobile station 100 performed by the approximate position calculation unit 112 (step S301: No), the case of failing in the judgement of the Zone 300 to which the mobile station 100 belongs performed by the zone judgement unit 113 (step S302: No), the case of failing in the acquisition of the positioning information performed by the positioning information acquisition unit 116 (step S304: No), or the case of failing in the calculation of the position of the mobile station 100 performed by the position calculation unit 117 (step S305: No).

First, in order to check the presence of the positioning infrastructure, that is, the anchors 200, the positioning system 101 observes a broadcast signal broadcasted from each of the anchors 200 around (step S306). The positioning system 101 observes the broadcast signal to acquire information such as received power and a propagation state. The propagation state includes a line-of-sight condition, and a multipath state. At that time, the positioning system 101 also acquires radio signal specifications from broadcast information included in the broadcast signal. The positioning system 101 extracts candidate anchors while giving priority to the anchors 200 having large received power and capable of ensuring the line-of-sight condition (step S307). The positioning system 101 prepares a list of the extracted anchors 200. At that time, the positioning system 101 excludes the anchors 200 communication with which has failed in step S304. The positioning system 101 determines, with the anchor-to-be-used determination unit 114, the anchors 200 to be used for positioning (step S303), and the process proceeds to step S304.

Note that, when the above operation is applied to the second embodiment, in a case where the positioning of the mobile station 103 based on the database 115 has failed for some reason, the positioning network device 104 shifts to an autonomous mode in which the positioning of the mobile station 103 is autonomously performed without using the database 115. The case where the positioning of the mobile station 103 based on the database 115 has failed for some reason corresponds to the case of failing in the calculation of the approximate position of the mobile station 103 performed by the approximate position calculation unit 124 of the mobile station 103 (step S301: No), the case of failing in the judgement of the Zone 300 to which the mobile station 103 belongs performed by the zone judgement unit 113 (step S302: No), the case of failing in the acquisition of the positioning information performed by the positioning information acquisition unit 125 of the mobile station 103 (step S304: No), or the case of failing in the calculation of the position of the mobile station 103 performed by the position calculation unit 121 (step S305: No).

First, in order to check the presence of the positioning infrastructure, that is, the anchors 200, the positioning network device 104 observes a broadcast signal broadcasted from each of the anchors 200 around via the mobile station 103 (step S306). The positioning network device 104 observes the broadcast signal to acquire information such as received power and a propagation state. At that time, the positioning network device 104 also acquires radio signal specifications from broadcast information included in the broadcast signal. The positioning network device 104 extracts candidate anchors while giving priority to the anchors 200 having large received power and capable of ensuring the line-of-sight condition (step S307). The positioning network device 104 prepares a list of the extracted anchors 200. At that time, the positioning network device 104 excludes the anchors 200 communication with which has failed in step S304. The positioning network device 104 determines, with the anchor-to-be-used determination unit 114, the anchors 200 to be used for positioning (step S303), and the process proceeds to step S304.

As described above, according to the present embodiment, in the case where inconsistency occurs between information stored in the database 115 and the actual communication state, the positioning system 101 shifts to the autonomous mode in which the positioning of the mobile station 100 is autonomously performed without using the database 115. Consequently, the positioning system 101 can avoid a situation in which the positioning of the mobile station 100 cannot be performed. Similarly, in the case where inconsistency occurs between information stored in the database 115 and the actual communication state, the positioning system 102 shifts to the autonomous mode in which the positioning of the mobile station 103 is autonomously performed without using the database 115. Consequently, the positioning system 102 can avoid a situation in which the positioning of the mobile station 103 cannot be performed.

A positioning system according to the present disclosure achieves an effect that it is possible to reduce a processing delay required for positioning and to reduce consumption of radio resources.

The configurations described in the above embodiments are merely examples and can be combined with other known technology, the embodiments can be combined with each other, and part of the configurations can be omitted or modified without departing from the gist thereof.

What is claimed is:

1. A positioning system comprising:
an approximate position calculation circuitry to calculate an approximate position of a mobile station;
a database to store information indicating a geographical position of a zone in which the mobile station is able to be present, information indicating an anchor to be used for positioning of the mobile station in each zone, and information on a communication parameter necessary for the mobile station to communicate with the anchor or measure a positioning signal from the anchor;
a zone judgement circuitry to judge a zone to which the mobile station belongs on a basis of an approximate position of the mobile station and information stored in the database;
an anchor-to-be-used determination circuitry to determine an anchor to be used by the mobile station for communication or measurement of a positioning signal on a basis of a zone to which the mobile station belongs and information stored in the database;
a positioning information acquisition circuitry to acquire positioning information indicating a positional relationship between the determined anchor and the mobile station by communication with the determined anchor or measurement of the positioning signal from the determined anchor; and
a position calculation circuitry to calculate a position of the mobile station on a basis of the positioning information and information stored in the database.

2. The positioning system according to claim 1, wherein the database stores the information in advance.

3. The positioning system according to claim 1, wherein the database acquires the information via a communication line and stores the information before starting use of the mobile station.

4. The positioning system according to claim 1, wherein information on the communication parameter stored in the database includes:
a cell global identity as information for identifying the anchor; and
as radio signal specifications, one or more of a center frequency, a frequency bandwidth, a subcarrier width, a cyclic prefix length, $N_{ID}^{cell}=3N_{ID}^{(1)}+N_{ID}^{(2)}$ that is synchronization signal information based on 3rd Generation Partnership Project standard TS 38.211, a port number, scramble IDs for generating types of demodulation reference signals, positioning reference signal resource allocation information, a downlink positioning reference signal sequence ID, and DL-PRS-ID-Info, NR-DL-PRS-AssistanceData, NR-DL-PRS-BeamInfo, NR-DL-PRS-Info, NR-DL-PRS-ResourceID, NR-DL-PRS-ResourceSetID, and NR-SelectedDL-PRS-IndexList described in TS 37.355-g20 that is information of which notification is performed by an upper layer in a 3rd Generation Partnership Project system.

5. The positioning system according to claim 1, wherein information on the communication parameter stored in the database includes:

unique information of the anchor as information for identifying the anchor; and as radio signal specifications, one or more of a channel number, scrambled timestamp sequence packet configuration information, a pulse repetition frequency mode, a preamble code, start frame delimiter field configuration information, a physical header parameter, and space time streams field configuration information.

6. The positioning system according to claim 1, wherein in a case of failing in calculation of an approximate position of the mobile station performed by the approximate position calculation circuitry, a case of failing in judgement of a zone to which the mobile station belongs performed by the zone judgement circuitry, a case of failing in acquisition of the positioning information performed by the positioning information acquisition circuitry, or a case of failing in calculation of a position of the mobile station performed by the position calculation circuitry, the positioning system shifts to an autonomous mode not using the database, observes a broadcast signal of the anchor around the mobile station to acquire received power, a propagation state, and radio signal specifications, and determines an anchor to be used for positioning.

7. The positioning system according to claim 1, wherein the approximate position calculation circuitry, the database, the zone judgement circuitry, the anchor-to-be-used determination circuitry, the positioning information acquisition circuitry, and the position calculation circuitry are mounted on the mobile station.

8. The positioning system according to claim 1, wherein the database, the zone judgement circuitry, the anchor-to-be-used determination circuitry, and the position calculation circuitry are mounted on a positioning network device installed on the ground, and the approximate position calculation circuitry and the positioning information acquisition circuitry are mounted on the mobile station.

9. A positioning network device that constitutes, together with a mobile station, a positioning system that measures a position of the mobile station, the positioning network device comprising:

an approximate position calculation instruction circuitry to instruct the mobile station to calculate an approximate position of the mobile station;

a database to store information indicating a geographical position of a zone in which the mobile station is able to be present, information indicating an anchor to be used for positioning of the mobile station in each zone, and information on a communication parameter necessary for the mobile station to communicate with the anchor or measure a positioning signal from the anchor;

a zone judgement circuitry to judge a zone to which the mobile station belongs on a basis of an approximate position of the mobile station calculated by the mobile station and information stored in the database;

an anchor-to-be-used determination circuitry to determine an anchor to be used by the mobile station for communication or measurement of a positioning signal on a basis of a zone to which the mobile station belongs and information stored in the database; and a position calculation circuitry to calculate a position of the mobile station on a basis of positioning information acquired by the mobile station and indicating a positional relationship between the determined anchor and the mobile station, and information stored in the database.

10. The positioning network device according to claim 9, wherein the database stores the information in advance.

11. The positioning network device according to claim 9, wherein the database acquires the information via a communication line and stores the information before starting use of the mobile station.

12. The positioning network device according to claim 9, wherein information on the communication parameter stored in the database includes:

a cell global identity as information for identifying the anchor; and as radio signal specifications, one or more of a center frequency, a frequency bandwidth, a subcarrier width, a cyclic prefix length, $N_{ID}^{cell}=3N_{ID}^{(1)}+N_{ID}^{(2)}$ that is synchronization signal information based on 3rd Generation Partnership Project standard TS 38.211, a port number, scramble IDs for generating types of demodulation reference signals, positioning reference signal resource allocation information, a downlink positioning reference signal sequence ID, and DL-PRS-ID-Info, NR-DL-PRS-AssistanceData, NR-DL-PRS-BeamInfo, NR-DL-PRS-Info, NR-DL-PRS-ResourceID, NR-DL-PRS-ResourceSetID, and NR-SelectedDL-PRS-IndexList described in TS 37.355-g20 that is information of which notification is performed by an upper layer in a 3rd Generation Partnership Project system.

13. The positioning network device according to claim 9, wherein information on the communication parameter stored in the database includes:

unique information of the anchor as information for identifying the anchor; and as radio signal specifications, one or more of a channel number, scrambled timestamp sequence packet configuration information, a pulse repetition frequency mode, a preamble code, start frame delimiter field configuration information, a physical header parameter, and space time streams field configuration information.

14. The positioning network device according to claim 9, wherein in a case of failing in calculation of an approximate position of the mobile station performed by the mobile station, a case of failing in judgement of a zone to which the mobile station belongs performed by the zone judgement circuitry, a case of failing in acquisition of the positioning information performed by the mobile station, or a case of failing in calculation of a position of the mobile station performed by the position calculation circuitry, the positioning network device shifts to an autonomous mode not using the database, observes a broadcast signal of the anchor around the mobile station to acquire received power, a propagation state, and radio signal specifications, and determines an anchor to be used for positioning.

15. A positioning control circuit for controlling a positioning system, the positioning system comprising:

a database to store information indicating a geographical position of a zone in which the mobile station is able to be present, information indicating an anchor to be used for positioning of the mobile station in each zone, and information on a communication parameter necessary for the mobile station to communicate with the anchor or measure a positioning signal from the anchor, and the positioning control circuit causing the positioning system to:

calculate an approximate position of the mobile station;

judge a zone to which the mobile station belongs on a basis of an approximate position of the mobile station and information stored in the database;

determine an anchor to be used by the mobile station for communication or measurement of a positioning signal on a basis of a zone to which the mobile station belongs and information stored in the database;

acquire positioning information indicating a positional relationship between the determined anchor and the mobile station by communication with the determined anchor or measurement of the positioning signal from the determined anchor; and calculate a position of the mobile station on a basis of the positioning information and information stored in the database.

16. A non-transitory computer-readable storage medium having stored therein a program for controlling a positioning system, the positioning system comprising:

a database to store information indicating a geographical position of a zone in which the mobile station is able to be present, information indicating an anchor to be used for positioning of the mobile station in each zone, and information on a communication parameter necessary for the mobile station to communicate with the anchor or measure a positioning signal from the anchor, and the program causing the positioning system to:

calculate an approximate position of the mobile station;

judge a zone to which the mobile station belongs on a basis of an approximate position of the mobile station and information stored in the database;

determine an anchor to be used by the mobile station for communication or measurement of a positioning signal on a basis of a zone to which the mobile station belongs and information stored in the database;

acquire positioning information indicating a positional relationship between the determined anchor and the mobile station by communication with the determined anchor or measurement of the positioning signal from the determined anchor; and calculate a position of the mobile station on a basis of the positioning information and information stored in the database.

17. A positioning method performed by a positioning system, the positioning system comprising:

a database to store information indicating a geographical position of a zone in which the mobile station is able to be present, information indicating an anchor to be used for positioning of the mobile station in each zone, and information on a communication parameter necessary for the mobile station to communicate with the anchor or measure a positioning signal from the anchor, and the positioning method comprising:

calculating, by an approximate position calculation circuitry, an approximate position of the mobile station;

judging, by a zone judgement circuitry, a zone to which the mobile station belongs on a basis of an approximate position of the mobile station and information stored in the database;

determining, by an anchor-to-be-used determination circuitry, an anchor to be used by the mobile station for communication or measurement of a positioning signal on a basis of a zone to which the mobile station belongs and information stored in the database;

acquiring, by a positioning information acquisition circuitry, positioning information indicating a positional relationship between the determined anchor and the mobile station by communication with the determined anchor or measurement of the positioning signal from the determined anchor; and calculating, by a position calculation circuitry, a position of the mobile station on a basis of the positioning information and information stored in the database.

* * * * *